(12) United States Patent
Smith et al.

(10) Patent No.: US 7,296,676 B2
(45) Date of Patent: *Nov. 20, 2007

(54) ADJUSTABLE CONVEYOR SYSTEM

(75) Inventors: Roger G. Smith, Lake Oswego, OR (US); Jason D. Gerard, Sandy, OR (US)

(73) Assignee: Construction Equipment Company, Lake Grove, OR (US)

( * ) Notice: Subject to any disclaimer, the term of this patent is extended or adjusted under 35 U.S.C. 154(b) by 321 days.

This patent is subject to a terminal disclaimer.

(21) Appl. No.: 11/053,729

(22) Filed: Feb. 7, 2005

(65) Prior Publication Data

US 2006/0175180 A1  Aug. 10, 2006

Related U.S. Application Data

(63) Continuation-in-part of application No. 10/971,355, filed on Oct. 22, 2004.

(60) Provisional application No. 60/574,280, filed on Jun. 9, 2005.

(51) Int. Cl.
   *B65G 21/00* (2006.01)
(52) U.S. Cl. ............... 198/861.4; 198/313; 198/315
(58) Field of Classification Search ............... 414/352, 414/505; 198/312, 313, 315, 317, 318, 861.4
   See application file for complete search history.

(56) References Cited

U.S. PATENT DOCUMENTS

| 517,724 A | 4/1894 | Beers |
| 983,659 A | 2/1911 | Titcomb |
| 1,796,549 A | 3/1931 | White |
| 2,115,110 A | 4/1938 | Keil |
| 2,366,222 A | 1/1945 | Tocci-Guilbert |
| 2,609,115 A | 9/1952 | Oklejas |
| 2,703,649 A | 3/1955 | Cheyette |
| 2,761,578 A * | 9/1956 | Brownlee et al. ............ 414/111 |
| 2,864,561 A | 12/1958 | Mork |
| 3,322,257 A * | 5/1967 | Phillips ...................... 198/536 |
| 3,322,354 A | 5/1967 | Ostermann et al. |
| 3,633,879 A * | 1/1972 | Prichard ...................... 366/68 |
| 3,710,695 A * | 1/1973 | Miller et al. .................. 404/98 |
| 3,802,022 A * | 4/1974 | Fleming ........................ 15/84 |

(Continued)

FOREIGN PATENT DOCUMENTS

CA   2094518   10/1994

(Continued)

OTHER PUBLICATIONS

"Extec E-7, S-3, S-4, S-5 and Screen Mobile". *Extec Screens & Crushers Limited Website.* Conceded to be early enough to constitute prior art. <http://www.extecscreens.com/home/.php?lang=eng>.

(Continued)

*Primary Examiner*—Joe Dillon, Jr.
(74) *Attorney, Agent, or Firm*—Kolisch Hartwell, P.C.

(57) ABSTRACT

A system for conveying material is disclosed. The system includes: a hopper having a feed end and a discharge end, wherein the feed end is configured to receive material; and an elongate conveyor downstream from the discharge end, wherein the elongate conveyor is configured to pivot about at least three axes.

14 Claims, 9 Drawing Sheets

U.S. PATENT DOCUMENTS

| | | |
|---|---|---|
| 4,031,976 A | 6/1977 | Lambert |
| 4,043,398 A | 8/1977 | Folser et al. |
| 4,058,198 A | 11/1977 | O'Neill et al. |
| 4,190,526 A | 2/1980 | Bachand |
| 4,256,572 A | 3/1981 | Read |
| 4,303,506 A | 12/1981 | Finlay |
| 4,363,725 A | 12/1982 | Morita et al. |
| 4,491,216 A * | 1/1985 | Sawby .................. 198/861.4 |
| 4,534,415 A | 8/1985 | Theurer et al. |
| 4,591,432 A | 5/1986 | Hartl |
| 4,613,275 A * | 9/1986 | Karlowsky .................. 414/489 |
| 4,624,357 A | 11/1986 | Oury et al. |
| 4,669,945 A * | 6/1987 | Pollard et al. .............. 414/505 |
| 4,781,513 A * | 11/1988 | Sjogren et al. ............. 414/489 |
| 4,861,461 A | 8/1989 | Utterback |
| 4,956,078 A | 9/1990 | Magerowski et al. |
| 4,983,280 A | 1/1991 | Eriksson |
| 4,997,135 A | 3/1991 | Zehr |
| 5,097,610 A | 3/1992 | Bishop |
| 5,100,537 A | 3/1992 | Krause |
| 5,106,490 A | 4/1992 | McDonald |
| 5,120,433 A | 6/1992 | Osadchuk |
| 5,234,564 A | 8/1993 | Smith |
| 5,248,042 A | 9/1993 | Kuhmonen |
| 5,285,905 A | 2/1994 | Laprade |
| 5,332,052 A | 7/1994 | Carnevale |
| 5,409,344 A * | 4/1995 | Tharaldson .................. 414/505 |
| 5,529,455 A * | 6/1996 | Kaster et al. ............... 414/523 |
| 5,577,618 A | 11/1996 | Rafferty |
| 5,582,221 A * | 12/1996 | Smith et al. ................ 141/250 |
| 5,718,556 A * | 2/1998 | Forsyth ...................... 414/503 |
| 5,765,966 A * | 6/1998 | White et al. ................ 405/174 |
| 5,819,950 A | 10/1998 | McCloskey |
| 5,980,189 A * | 11/1999 | Rubner ....................... 414/505 |
| 6,360,876 B1 * | 3/2002 | Nohl et al. ................. 198/588 |
| 6,543,622 B1 * | 4/2003 | Fridman .................... 209/421 |

FOREIGN PATENT DOCUMENTS

| | | |
|---|---|---|
| DE | 285882 | 12/1913 |
| EP | 0 284 296 | 4/1991 |
| GB | 1 414 786 | 11/1975 |
| GB | 1 415 640 | 11/1975 |
| GB | 1 449 001 | 9/1976 |
| GB | 1 480 688 | 7/1977 |
| GB | 1553667 | 9/1979 |
| GB | 217559 | 12/1986 |
| GB | 2200613 | 8/1988 |
| GB | 2 223 963 | 4/1990 |
| WO | WO85/03652 | 8/1985 |

OTHER PUBLICATIONS

"Hydraulic Rotary Actuators" *Helac Corporation Product Literature*. Conceded to be early enough to constitute prior art.

"The Screen Machine Spyder™ 514T" *The Screen Machine® Product Specification*. Conceded to be early enough to constitute prior art.

"McCloskey 407". *McCloskey International Website*. Conceded to be early enough to constitute prior art. <http://www.mccloskeyinternational.com/Products/Products/pg>.

Description of the McCloskey Brothers Mfg. Trommel Model MCB 833. Conceded to be early enough to constitute prior art.

Description of McCloskey Brothers Mfg. Trommel Model MCB 621. Conceded to be early enough to constitute prior art.

Chieftain 1400, Powerscreen International Distribution Ltd., www.powerscreen.com/dry_screening/chieftain_1400. Conceded to be early enough to constitute prior art.

Trommels: MCB 621RE, McCloskey International Limited, www.mcbtrommels.com/mcb621re.asp. Conceded to be early enough to constitute prior art.

* cited by examiner

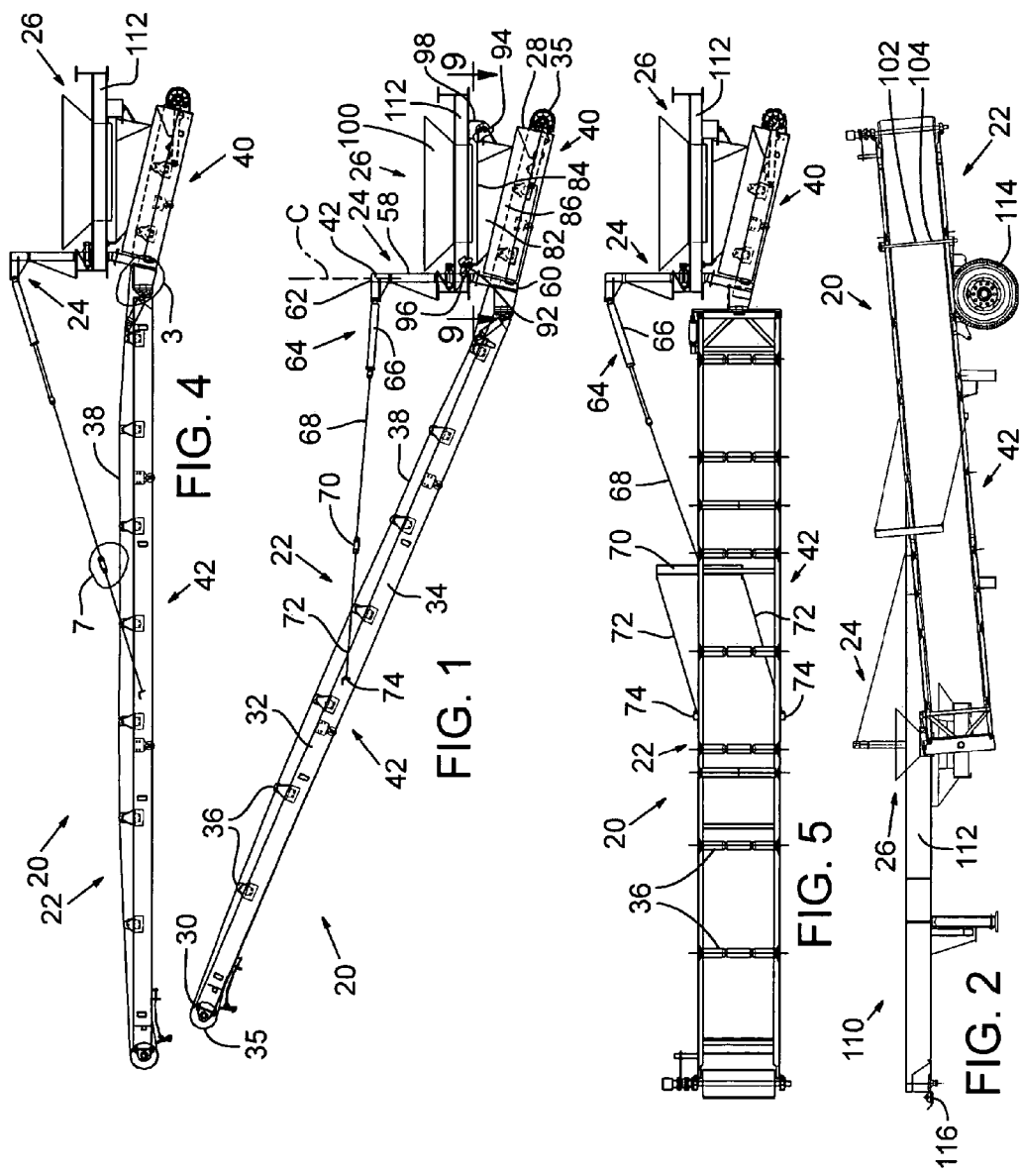

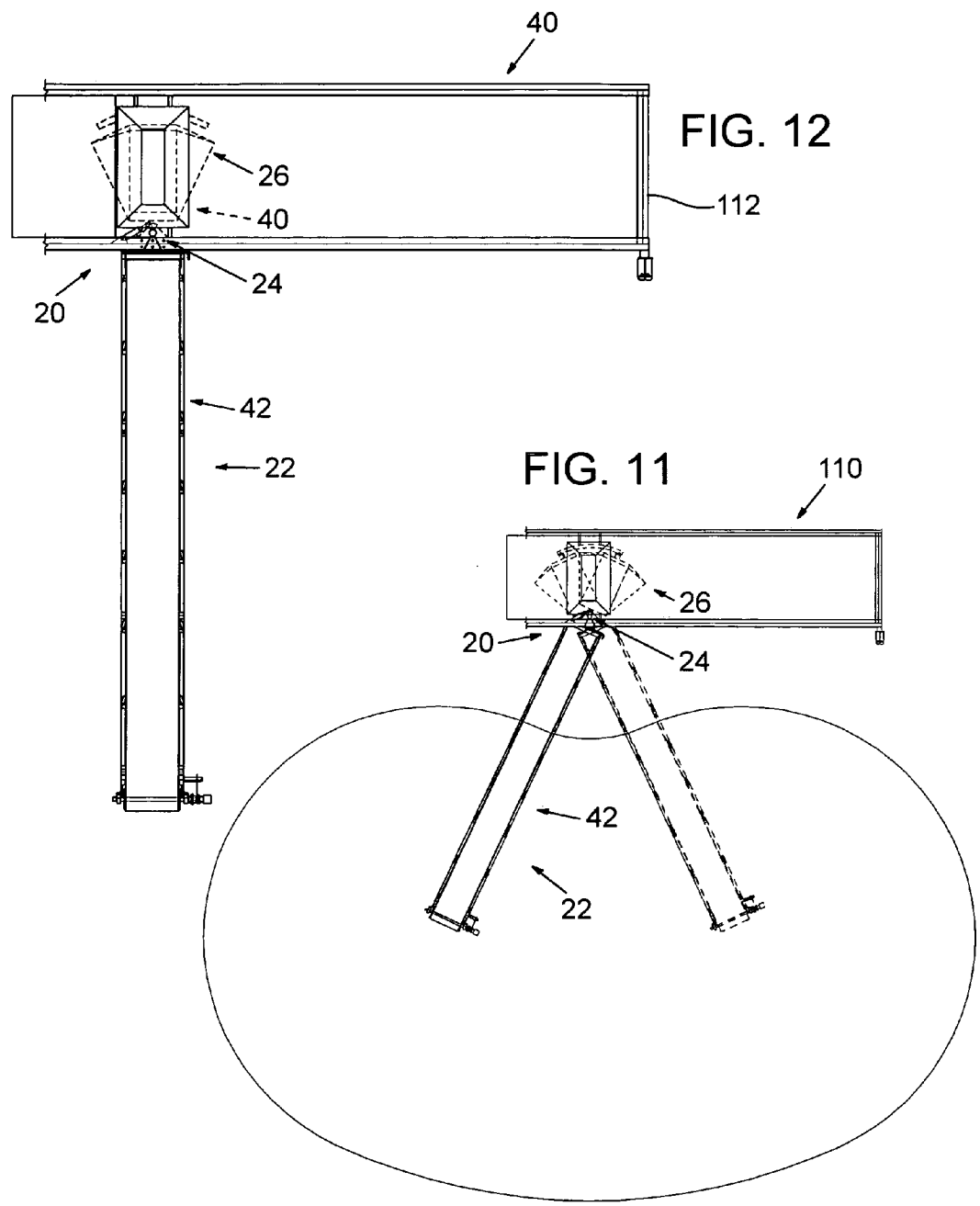

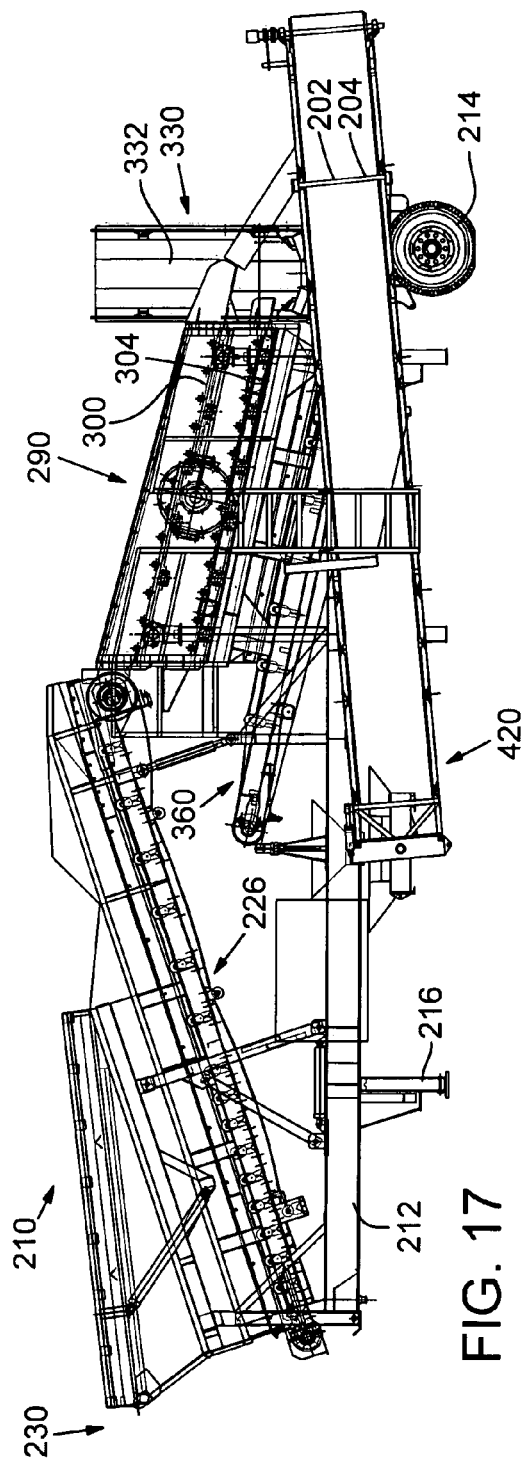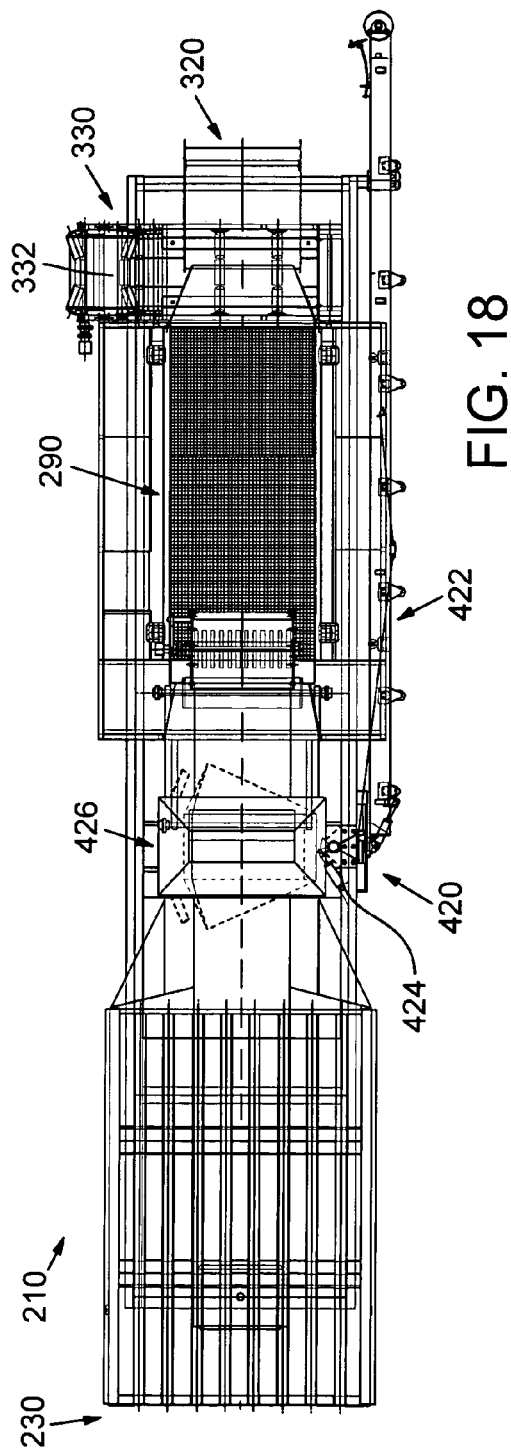

ADJUSTABLE CONVEYOR SYSTEM

CROSS-REFERENCE TO RELATED APPLICATIONS

This application is a continuation-in-part of U.S. patent application Ser. No. 10/971,355, filed Oct. 22, 2004 and entitled "Adjustable Conveyor System," which claims priority under 35 U.S.C. § 119(e) to U.S. Provisional Patent Application Ser. No. 60/574,280 entitled "Stowable Material Transport Conveyor," filed Jun. 9, 2005, the entire disclosures of both applications are herein incorporated by reference for all purposes.

BACKGROUND

Various systems are used for processing dirt and/or debris mixtures, which may include rocks, concrete pieces, stumps, stones, discarded hardware, and other types of dirt and/or debris. That processing may include feeding and screening the dirt and/or debris mixtures into multiple piles. For example, one pile may contain essentially soil, and other piles may contain material of different sizes with at least some of those piles having commercial value as a recycled product. An example of a system for processing dirt and/or debris mixtures is illustrated in U.S. Pat. No. 5,234,608, the entire disclosure of which is herein incorporated by reference for all purposes.

Many processing systems are mobile to enable a user to relocate those systems when the user needs to process the mixtures and form the piles in a different location. Sometimes the user needs to relocate the systems because the piles are at the desired levels and the user needs to form the piles in different locations, such as adjacent the previous piles.

To minimize relocation of the processing systems, multiple conveyors may be provided in those systems to allow the user to form piles of processed material in different locations. Alternatively, adjustable conveyor systems may be provided to allow the user to form piles in different locations, or to form wider piles, and still allow easy relocation of the processing systems.

SUMMARY

One embodiment provides a system for conveying material. The system includes: a hopper having a feed end and a discharge end, wherein the feed end is configured to receive material; and an elongate conveyor downstream from the discharge end, wherein the elongate conveyor is configured to pivot about at least three axes.

BRIEF DESCRIPTION OF THE DRAWINGS

FIG. 1 is side view of an adjustable conveyor system mounted on a vehicle frame with a conveyor in one of its plural extended positions.

FIG. 2 is an elevation view of the adjustable conveyor system of FIG. 1 with the conveyor in the inoperative position.

FIG. 4 is a side view of the adjustable conveyor system of FIG. 1 with the conveyor in another extended position.

FIG. 5 is a side view of the adjustable conveyor system of FIG. 1 with the conveyor in an intermediate extended position and shown without a conveyor belt.

FIG. 11 is plan view of the adjustable conveyor system of FIG. 1 showing the conveyor in two of its plural extended positions.

FIG. 12 is a plan view of the adjustable conveyor system of FIG. 1 showing the conveyor in another one of its plural extended positions.

FIG. 17 is a side view of the mobile screening system of FIG. 16 showing the adjustable conveyor system in an inoperative position and the intermediate deck conveyor in an inoperative position.

FIG. 18 is a top view of the mobile screening system of FIG. 16 showing the adjustable conveyor system in the inoperative position and the intermediate deck conveyor in the inoperative position.

DETAILED DESCRIPTION

Figure 3:
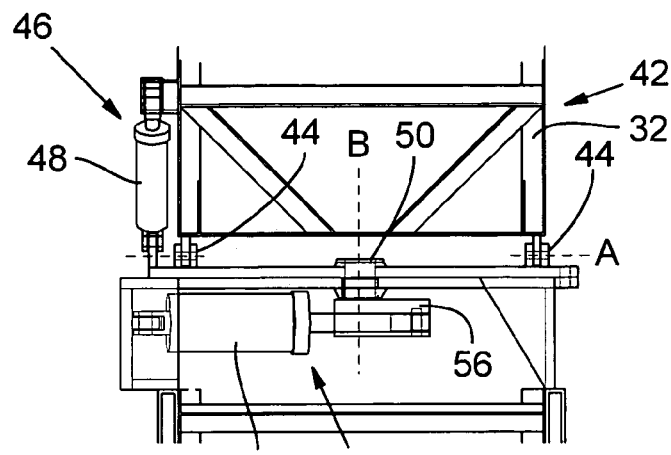
FIG. 3 is a partial view of the adjustable conveyor system of FIG. 1 showing a conveyor without a conveyor belt and a pivoting connector assembly.

FIGS. 1-2 depict an embodiment of an adjustable conveyor system 20 having a conveying structure 22, a support structure 24, and a feed structure 26. The adjustable conveyor system may be supported by a vehicle 110. Vehicle 110 includes an elongate vehicle frame 112. Supporting one end of the frame for movement over the ground, which is the rear end of the frame in the particular embodiment illustrated, are transport wheels 114. The opposite end of the vehicle frame, which is the frame's forward end, mounts a hitch component 116, which is connectable with suitable hitch structure at the rear of a drawing vehicle or tractor to ready the vehicle for movement as a trailer over a road or highway.

Although adjustable conveyor system 20 is shown to be supported by a particular vehicle, the adjustable conveyor system may be supported by any suitable structure configured to enable the user to relocate or move the adjustable conveyor system to desired locations. For example, adjustable conveyor system 20 may be mounted on any mobile screening system, which may or may not be on a vehicle, and which may be wheeled or tracked.

Conveying structure 22 includes any structure configured to transport material from a feed end 28 to a discharge end 30. The conveying structure includes an elongate conveyor 32 including an elongate frame 34, end rolls 35, rollers 36, and a conveyor belt 38. Conveyor belt 38 moves in a direction from feed end 28 to discharge end 30 and may be made of any suitable material configured to flex and remain operatively connected to elongate conveyor 38 when all or portions of the elongate conveyor is pivoted around plural axes, as further discussed below. Any suitable drive system may be used configured to move conveyor belt 38.

The elongate conveyor includes a feed portion 40 and a conveying portion 42 pivotally connected to the feed portion, as further discussed below. Feed portion 40 is configured to received material from, for example, feed structure 26. Conveying portion 42 is configured to move material from feed portion 40 to discharge end 30 and may be a substantial portion or a majority of length of elongate conveyor 32.

A pair of elongate skirt boards (not shown) may be mounted along elongate frame 34. Those skirt boards have lower edges adjacent the upper belt run of conveyor belt 38, and from the lower edges extend upwardly and then incline outwardly to terminate in upper edges. The skirt boards help to maintain material suitable located over the conveyor belt as the material is carried forwardly by the belt.

Figure 8:
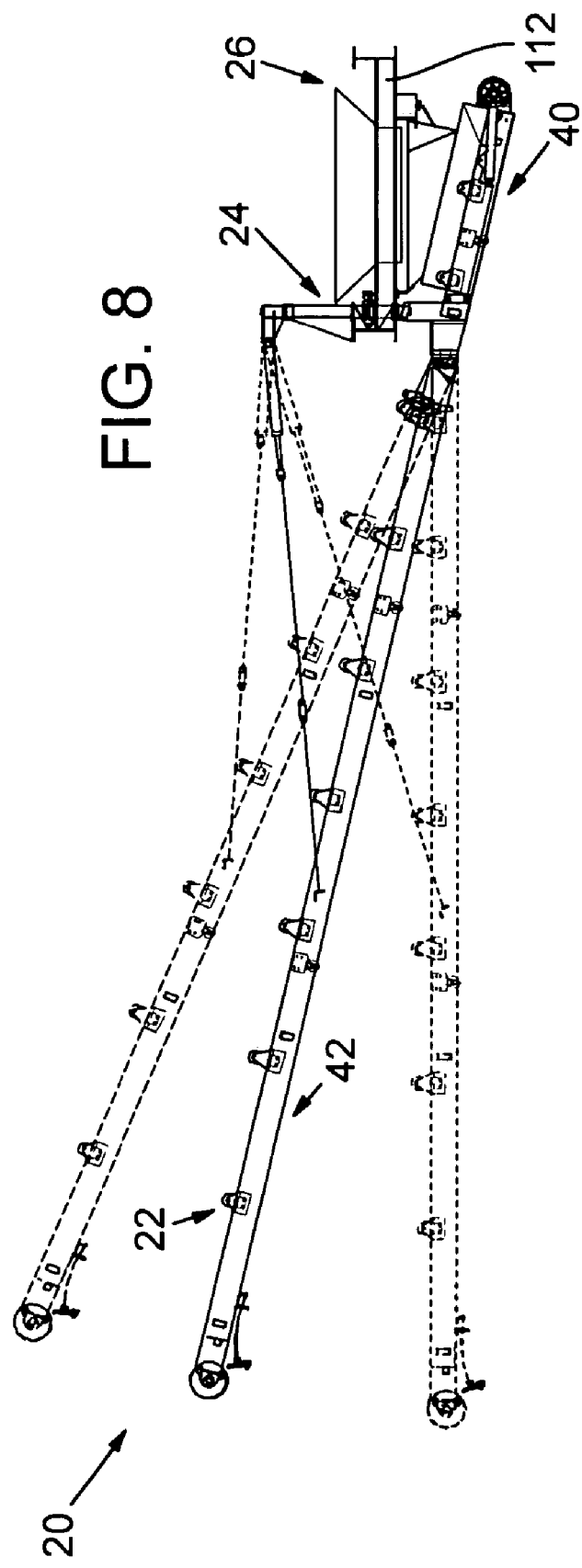
FIG. 8 is a side view of the adjustable conveyor system of FIG. 1 showing the conveyor in three of its plural extended positions without a conveyor belt.

Conveying portion 42 is pivotably connected to feed portion 40 via hinge connections 44 configured to allow conveying portion 42 to pivot around an incline axis A. An example of suitable hinge connections is illustrated in FIG. 3. The hinge connections allow adjusting of the incline of conveying portion 42 from a horizontal position, as shown in FIG. 4, to plural inclined positions, as shown in FIGS. 1 and 8.

Additionally, the hinge connections allow pivoting of conveying portion 42 from a pivoted position, as shown in FIG. 5, to a travel position, as shown in FIG. 2. To facilitate the pivoting of conveying portion 42, a first pivoting connector assembly 46 may be connected to conveying portion 42, which includes any structure configured to pivot the conveying portion around incline axis A. For example, as illustrated in FIG. 3, first pivoting connector assembly 46 includes a radial swinging or telescoping cylinder 48 connected to conveying portion 42 configured to pivot that portion in any suitable range. First pivoting connector assembly 46 may be connected to any suitable hydraulic system (not shown) or other drive system configured to selectively move telescoping cylinder 48 thereby pivoting conveying portion 42.

The conveying portion also is pivotably connected to feed portion 40 via rotary connection 50 configured to allow conveying portion 42 to pivot around a stowing axis B. An example of a suitable rotary connection is illustrated in FIG. 3. The rotary connection allows the pivoting of conveying portion 42 from a working position, as shown in FIG. 4, to a pivoted position, as shown in FIG. 5. Any suitable locking mechanism, such as locking pins, latches, etc., may be used to lock conveying portion 42 in the working position and/or the pivoted position.

Figure 6:
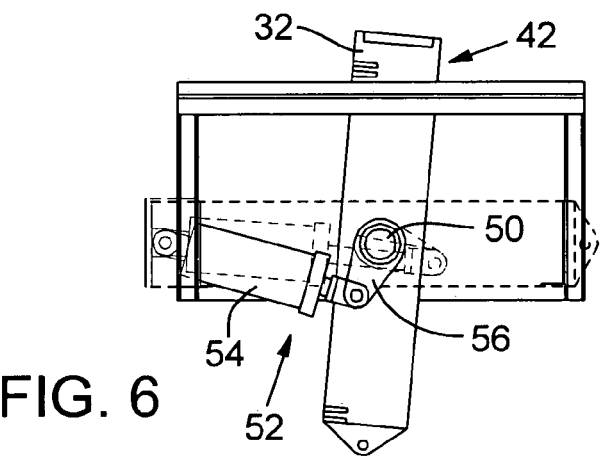
FIG. 6 is another partial view of the adjustable conveyor system of FIG. 1 showing the pivoting connector assembly when the conveyor is in the intermediate extended position and without a conveyor belt.

A second pivoting connector assembly 52 may be connected to rotary connection 50 and includes any structure configured to pivot conveying portion 42 around stowing axis B. For example, as illustrated in FIGS. 3 and 6, second pivoting connector assembly 52 includes a radial swinging or telescoping cylinder 54 connected to a lever 56, which is connected to rotary connection 50. The second pivoting connector assembly may be configured to pivot conveying portion 42 in any suitable range. Additionally, second pivoting connector assembly 52 may be connected to any suitable hydraulic system (not shown) or other drive system configured to selectively move telescoping cylinder 54 thereby pivoting conveying portion 42.

Support structure 24 includes any structure configured to support elongate conveyor 32. The support structure includes support bar 58 pivotally mounted on vehicle frame 112. Support bar 58 includes a first end portion 60 below vehicle frame 112 and a second end portion 62 above vehicle frame 112. The first end portion supports elongate conveyor 32 between feed portion 40 and conveying portion 42 below vehicle frame 112. Additionally, first end portion 60 allows elongate conveyor 32 to pivot among plural extended or working positions around a spreading axis C. Although the support structure is illustrated to support the elongate conveyor below the vehicle frame, the support structure may be configured to support that conveyor above or on the same plane as the vehicle frame. Moreover, although support bar 58 is shown to support elongate conveyor 32 between feed portion 40 and conveying portion 42, that conveyor may be supported in any suitable location and by any suitable structure.

Figure 7:
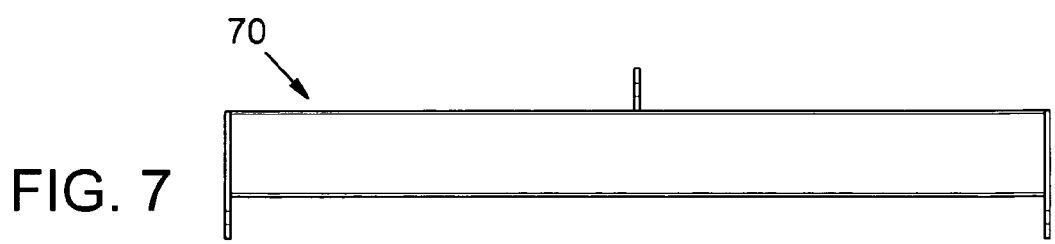
FIG. 7 is a plan view of a cable cross beam used in the adjustable conveyor system of FIG. 1.

Additionally, a third pivoting connector assembly 64 operatively connects second end portion 62 and conveying portion 42 of elongate conveyor 32. The third pivoting connector assembly includes any structure configured to pivot conveying portion 42 around incline axis A. For example, as illustrated in FIG. 1, third pivoting connector assembly 64 may include a telescoping cylinder 66, a central cable 68, a cable cross beam 70 (also shown in FIG. 7), support cables 72, and connectors 74 located on the sides of conveying portion 42 of the elongate conveyor. The third pivoting connector assembly may be configured to pivot conveying portion 42 in any suitable range thereby allowing for plural extended positions, three of which are shown in FIG. 8. Additionally, third pivoting connector assembly 64 may be connected to any suitable hydraulic system (not shown) or other drive system configured to selectively move telescoping cylinder 66 thereby pivoting conveying portion 42 around incline axis A.

Figure 9:
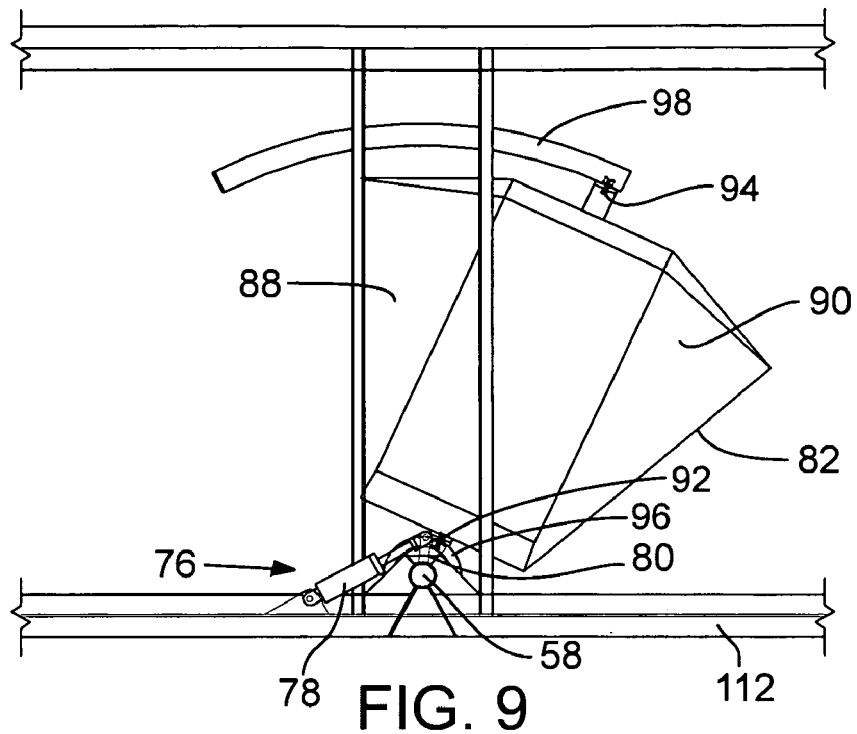
FIG. 9 is a cross-sectional partial view of the adjustable conveyor system taken along lines 9 of FIG. 1 showing the hopper and the feed portion of the elongate conveyor.
Figure 10:
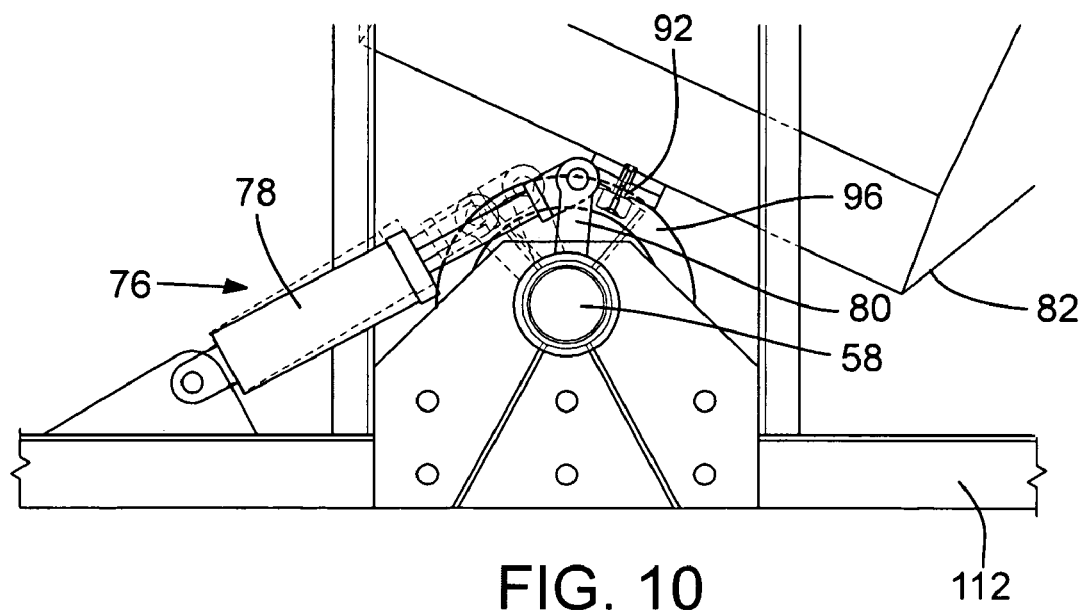
FIG. 10 is a partial view of the pivoting connector assembly of FIG. 9.

The adjustable conveyor system further includes a fourth pivoting connector assembly 76, which includes any structure configured to pivot elongate conveyor 32 around spreading axis C. For example, as illustrated in FIGS. 9 and 10, fourth pivoting connector assembly 76 may include a telescoping cylinder 78 connected to a lever 80, which is connected to support bar 58. The fourth pivoting connector assembly may be configured to pivot elongate conveyor 32 in any suitable range. Additionally, fourth pivoting connector assembly 76 may be connected to any suitable hydraulic system (not shown) or other drive system configured to selectively move telescoping cylinder 78 thereby pivoting elongate conveyor 32 around spreading axis C.

Fourth pivoting connector assembly 76 may be configured to pivot elongate conveyor in any suitable pivot range thereby allowing adjustable conveyor system 20 to have plural extended or working positions, two of those positions are illustrated in FIG. 11. Those plural working positions allow the discharge of material into wider piles. For example, the fourth pivoting connector assembly may allow for a 54-degree range, which may allow for approximately four times the pile volume compared to a non-pivoting conveyor assembly.

Although the pivotal connections illustrated include hinges and rotary connections, any suitable pivotal connection configured to allow adjustable conveyor system 20 to pivot around plural axes may be used. Additionally, although the pivoting connector assemblies illustrated include radial swinging or telescoping cylinders and drive systems, any suitable pivoting connector structure configured to allow adjustable conveyor system 20 to pivot around plural axes may be used. For example, rotary hydraulic cylinders, rotary pneumatic cylinders, servo motors, and rotary turntable systems may alternatively, or additionally, be used. Moreover, although the pivoting connector assemblies illustrated all have similar structures, any combination of similar or different structures may be used for the pivoting connector assemblies of the adjustable conveyor system. Furthermore, although four pivoting connector assemblies have been illustrated, the adjustable conveyor system may have more or less assemblies configured to allow that system to pivot around plural axes, including the axes disclosed above.

Feed structure 26 includes any structure configured to receive material and feed that material to conveying structure 22. The feed structure includes a hopper 82 located below vehicle frame 112 with a feed end 84 and a discharge end 86 (see FIGS. 1 and 9). The hopper may be any suitable hopper including a hopper with wing walls 88 and 90, which may be stationary or hinged.

Hopper 82 may be completely open at the forward end of the hopper. This is referred to herein as a completely open forward throat for the hopper, which is advantageous, as it means that randomly encountered large objects, such as stumps, used plumbing hardware, rocks, etc., are free to move forwardly with the conveyor belt without meeting an over hanging obstruction that would impede such motion. Hopper 82 also is operatively connected to feed portion 40 of elongate conveyor 32 and thus pivots with elongate conveyor 32 around spreading axis C via fourth pivoting connector assembly 76. Although hopper 82 is illustrated to be below vehicle frame 112, the hopper may be configured to be above or in the same plane as the vehicle frame.

Hopper 82 also is supported by support structure 24. Support structure 24 includes tracks 96 and 98, which includes any structure configured to support hopper 82 and/or feed portion 40 of elongate conveyor 32 and allow pivoting around spreading axis C. Hopper 82 is slidingly connected to the tracks via cam or track followers 92 and 94. Although the support structure is illustrated to include tracks, any suitable structure configured to support hopper 82 and/or feed portion 40 of elongate conveyor 32 and allow pivoting around spreading axis C may be used. Additionally, although hopper 82 is shown to include the track followers, feed portion 40 may instead or in addition have track followers slidingly connected to tracks 96 and 98.

Feed structure 26 also may include a stationary hopper 100 located above vehicle frame 112. Hopper 82 and stationary hopper 100 are configured to ensure that materials are properly fed onto feed portion 40 of elongate conveyor 32 regardless of the working position the elongated conveyor.

Although feed structure 26 is illustrated to include swinging and stationary hoppers, one type of hopper may be used exclusively or any other combination may be used that is configured to ensure that materials are properly fed onto feed portion 40 of the elongate conveyor. Additionally, although feed structure 26 is shown to be located just above feed portion 40 of elongate conveyor 32, additional structure may be located between feed structure 26 and feed portion 40 so long as the feed portion is downstream from the feed structure.

In operation, conveying structure 22 and feed structure 26 is pivotable among plural extended or working positions, as illustrated in FIG. 11, via fourth pivoting connector assembly 76. Adjustable conveyor system may thus be adjusted among the plural extended positions based on desired pile locations or pile widths.

Figure 14:
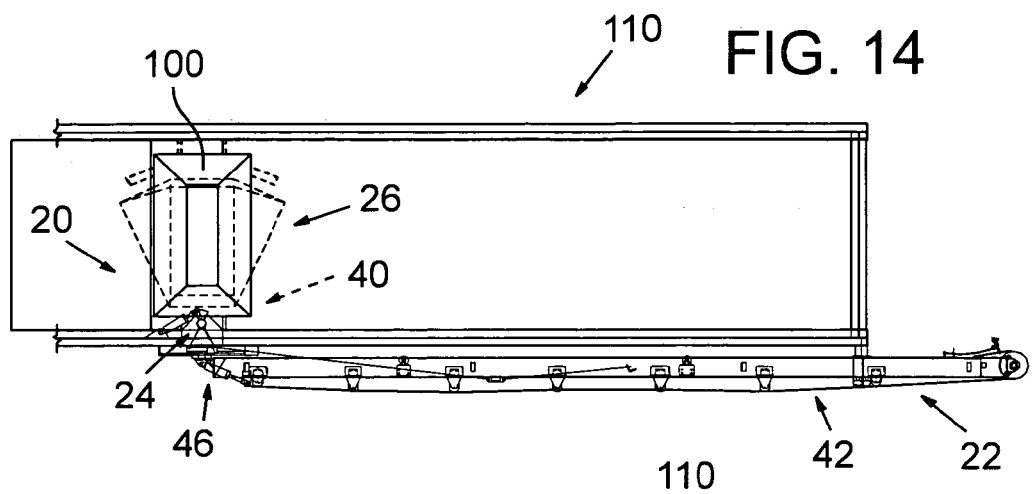
FIG. 14 is a top view of the adjustable conveyor system of FIG. 1 when the conveyor is in the inoperative position.
Figure 13:
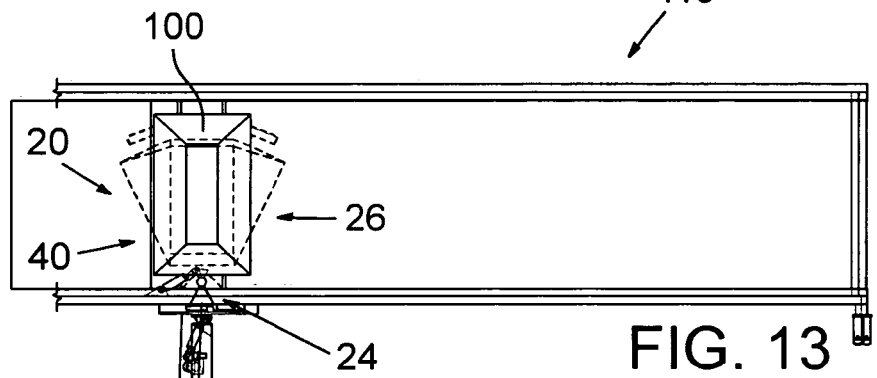
FIG. 13 is a top view of the adjustable conveyor system of FIG. 1 when the conveyor is in the intermediate position.

When the adjustable conveyor system needs to be moved or relocated, the system may be adjusted to an inoperative or travel position. First, the conveying and feed structures are pivoted to a starting position illustrated in FIG. 12 via third pivoting connector assembly 64 and/or fourth pivoting connector assembly 76. Second, conveying portion 42 of elongate conveyor 32 is pivoted to an intermediate extended position illustrated in FIG. 13 via second pivoting connector assembly 52. Third, conveying portion 42 is pivoted to an intermediate inoperative position running lengthwise along the vehicle frame illustrated in FIG. 14 via first pivoting connector assembly 46. Fourth, conveying portion 42 is pivoted to a travel or an inoperative position running lengthwise and/or inclining along the vehicle frame illustrated in FIG. 2 via second pivoting connector assembly 52.

Figure 15:
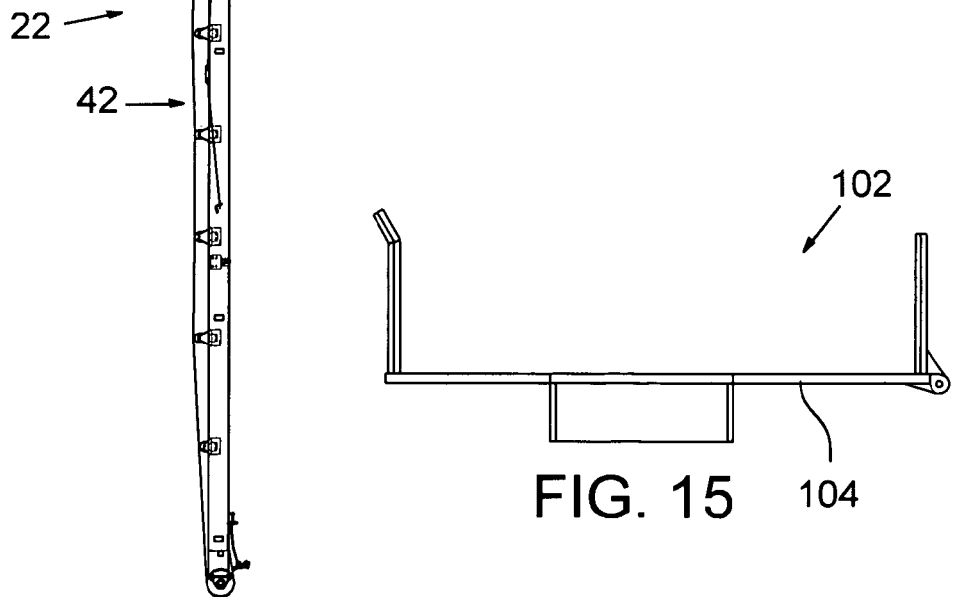
FIG. 15 is a plan view of a trailering mount used in the adjustable conveyor system of FIG. 1.

Furthermore, a locking assembly 102 may be used to secure conveying portion 42 in the travel position, as illustrated in FIG. 2. Locking assembly 102 may include traileriring mount 104 shown in FIG. 15 or any other suitable structure configured to secure conveying portion 42 of the elongate conveyor to the travel position. Thus, the adjustable conveyor system is configured to pivot conveying portion 42 among an inoperative position, where the conveying portion runs lengthwise along vehicle frame 112 (where an end of the conveying portion may extend beyond an end of the vehicle frame), and plural working positions, where the conveying portion runs laterally of the vehicle frame.

To adjust the adjustable conveyor system from the inoperative position to one of plural extended or working positions, the steps above may simply be reversed. However, the steps discussed above may be performed in different sequences and in different combinations, not all steps being required for all embodiments of the adjustable conveyor system.

Although adjustable conveyor system 20 has been described to include feed structure 26, such structure is not essential to the adjustable conveyor system. For example, adjustable conveyor system 20 may be used to receive the discharge from a screening system or any other system and not require a feed structure.

Additionally, or alternatively, adjustable conveyor system 20 may be driven by a two-speed or other variable-speed hydraulic motor (not shown). Adjusting the speed of the conveyor during operation may allow piling of material at two or more distances from discharge end 30, which may allow an increase of pile volume as compared to a non-variable-speed conveyor.

Figure 16:
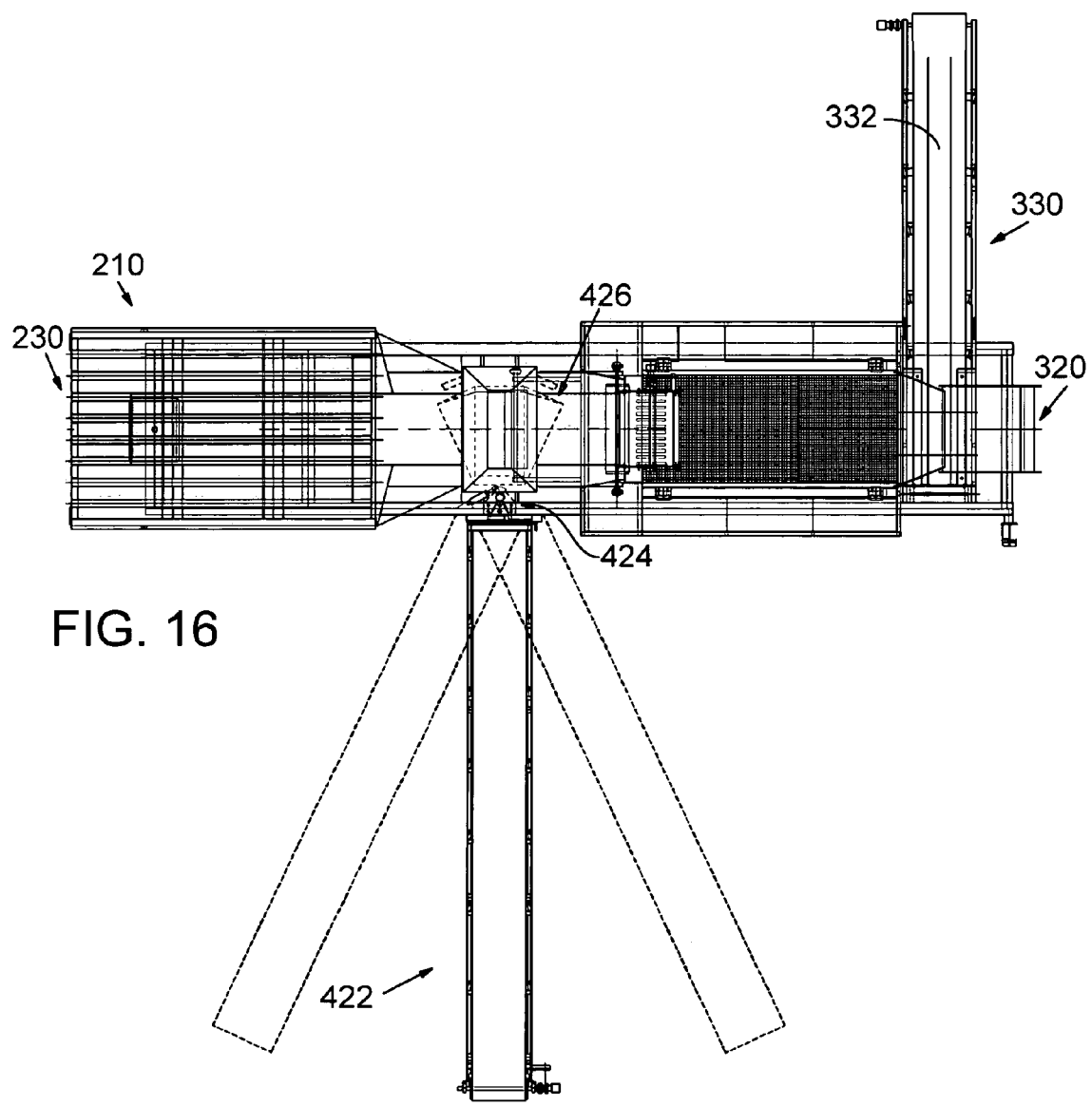
FIG. 16 is a top view of a mobile screening system with an adjustable conveyor system showing the adjustable conveyor system in three of its plural extended positions and an intermediate deck conveyor in an extended position.

FIGS. 16-18 show a mobile screening system or feeding and screening vehicle 210 that includes an embodiment of the adjustable conveyor system. The vehicle includes an elongate vehicle frame 212. Supporting one end of the frame for movement over the ground, which is the rear end of the frame are transport wheels 214. The opposite end of the vehicle frame, which is the frame's forward end, mounts a hitch component 216, which is connectable with suitable hitch structure at the rear of a drawing vehicle or tractor to ready the vehicle for movement as a trailer over the road or highway. Although the mobile screening system is shown to be supported by a wheeled vehicle frame, any suitable vehicle frame may be used, including a tracked vehicle frame.

The forward portion of the vehicle includes a hopper and an inclined, material-transport conveyor, which carries material fed from the hopper rearwardly to an elevated position on the vehicle. The material-transport conveyor is shown at 226, and the hopper at 230.

The transport conveyor may extend a substantial portion of the length of the vehicle frame, and extends from adjacent the forward end of the vehicle frame to slightly beyond its midpoint progressing from the forward to the rear end of the frame. The hopper is disposed over a lower inclined portion of the inclined transport conveyor.

Mounted as a continuation of the material-transport conveyor, in a position extending from approximately the midpoint of the vehicle to the rear end of the vehicle, is a multiple deck screen assembly 290. The assembly has two decks, namely upper deck 300 and lower deck 304.

Each deck includes heavy-duty screening extending along the length of the deck. The screening on the top deck has a coarser mesh than the screening on the deck below it. The screening in both decks slope or incline downwardly progressing from the feed end of the screen assembly, which is directly adjacent the outfeed end of the material-transport conveyor, to the discharge end of the assembly, which is located at the rear of the vehicle approximately over wheels 214.

Material on traveling through the screen assembly is separated into three different fractions. The largest fraction, comprising stumps, large rocks, etc., travels down the upper deck without passing through the screen of the deck and then onto a material-channeling structure or chute 320. The largest material leaving the upper deck of the screen assembly travels onto this chute then to be deflected into a region located rearwardly of the rear end of the vehicle.

Adjacent the rear end of the vehicle is an intermediate deck conveyor 330. Material that passes through the upper deck screen and is retained on the lower deck, on cascading down the incline of the lower deck, is deposited on conveyor 330 to collect as a pile at an end of section 332 with the section in its inclined position. Intermediate deck conveyor 330 may include any suitable structure configured to provide adjustability between an extended position, as shown in FIG. 16, and an inoperative position, as shown in FIGS. 17-18. For example, the intermediate deck conveyor may be pivotally connected at two or more locations along the length of the conveyor. Additionally, a pivoting connector assembly, such as the assemblies described above, may be used to pivot the intermediate deck conveyor between the extended position and the inoperative position.

Although intermediate deck conveyor 330 is shown to have particular inoperative and extended positions shown in FIGS. 16-18, the intermediate deck conveyor may be configured to have any suitable inoperative and/or extended positions. For example, at least some of the pivotal connections and pivoting connector assemblies described for adjustable conveyor system 20 may be used to enable intermediate deck conveyor 330 to be adjusted between an extended position, as shown in FIG. 16, and an inoperative position in which a substantial portion of that conveyor runs lengthwise along a side of vehicle frame 212 towards a central portion of the vehicle frame.

Extending under the lower deck of the screen assembly, and in an inclined position, is what is referred to as an under-screen conveyor 360. That conveyor extends throughout a portion of its length completely under the lower deck of the screen assembly, and functions to collect material that passes through the lower deck and to convey the material upwardly and toward the front of the vehicle frame.

Downstream the outfeed end of the under-screen conveyor is an embodiment of the adjustable conveyor system 420. The adjustable conveyor system includes at least some of the structure discussed above and is configured to be adjustable among an inoperative position and plural extended positions. For example, adjustable conveyor system 420 includes a conveying structure 422, a support structure 424, and a feed structure 426.

Additionally, the adjustable conveyor system is adjustable among plural extended positions, three of which are shown in FIG. 16, and an inoperative position, as shown in FIGS. 17-18. Furthermore, a locking assembly 202 may be used to secure conveying structure 422 in the inoperative position, as illustrated in FIG. 17. Locking assembly 202 may include trailering mount 204 shown in FIG. 17 or any other suitable structure configured to secure conveying structure 422 of the adjustable conveyor system to the inoperative position.

Figure 19:
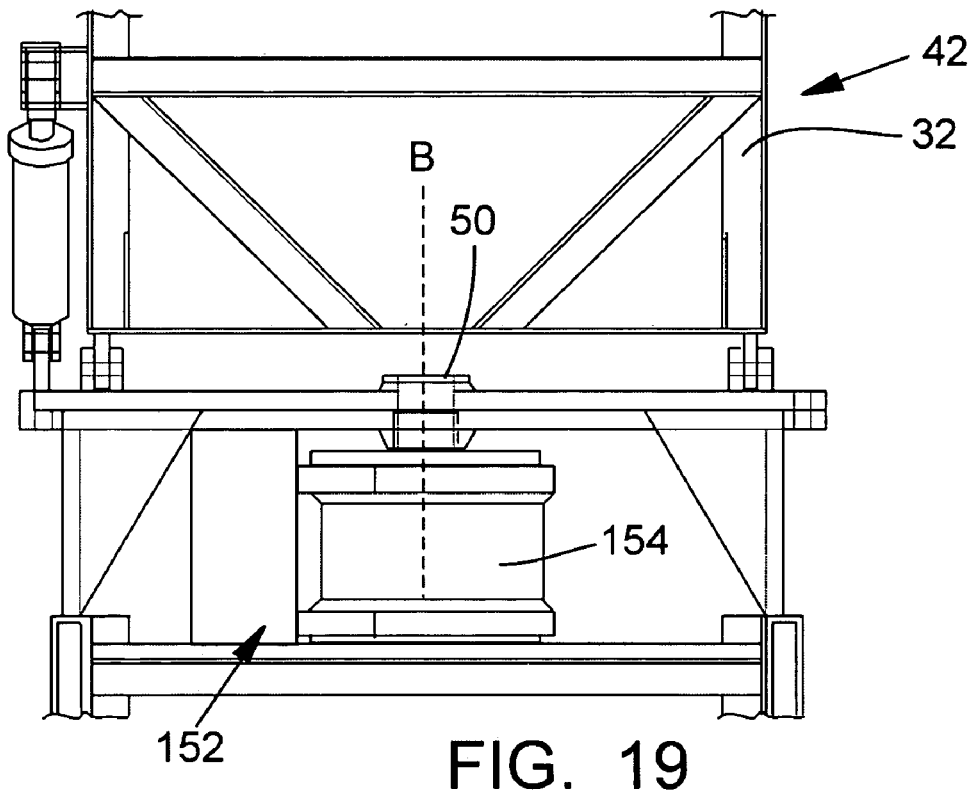
FIG. 19 is a partial view of the adjustable conveyor system of FIG. 1 showing a conveyor without a conveyor belt and an alternative pivoting connector assembly.
Figure 20:
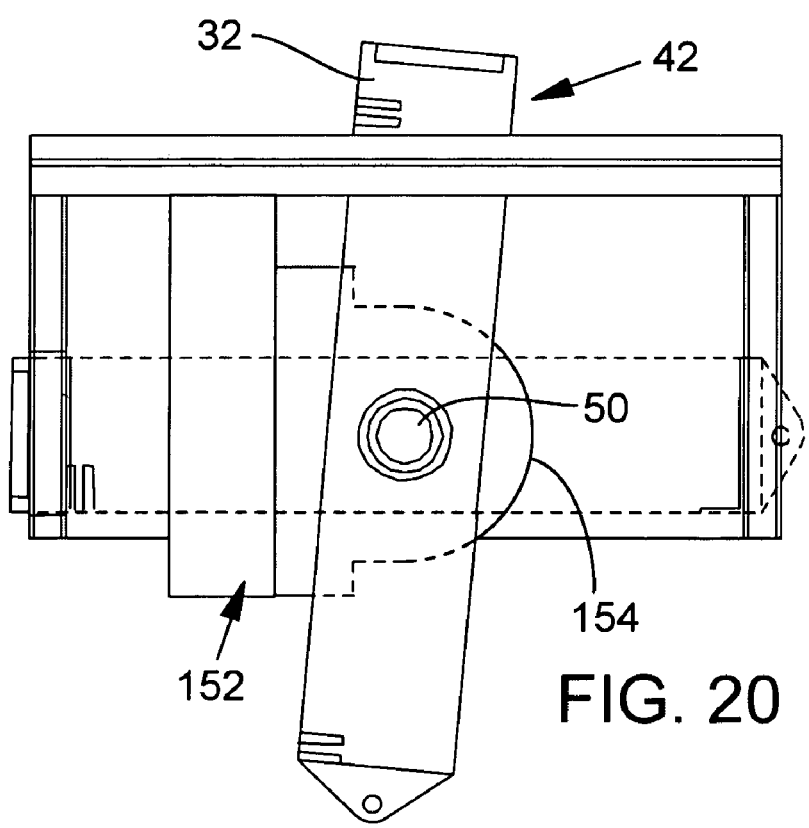
FIG. 20 is another partial view of the adjustable conveyor system of FIG. 1 showing the alternative pivoting connector assembly when the conveyor is in the intermediate extended position and without a conveyor belt.

As discussed above, although the pivoting connector assemblies illustrated in FIGS. 1-18 include radial swinging or telescoping cylinders and drive systems, any suitable pivoting connector structure configured to allow adjustable conveyor system 20 to pivot around plural axes may be used. For example, FIGS. 19-20 illustrate an alternative second pivoting connector assembly 152. The second pivoting connector assembly 152 may be connected to rotary connection 50 and includes any structure configured to pivot conveying portion 42 of elongate conveyor 32 around stowing axis B. For example, second pivoting connector assembly 152 may include a rotary turntable or rotary actuator 154 connected to rotary connection 50. An example of a suitable rotary actuator is disclosed in U.S. Pat. No. 4,422,366, the entire disclosure of which is herein incorporated by reference for all purposes.

The rotary actuator may be configured to pivot conveying portion 42 in any suitable range. Additionally, rotary actuator 154 may be connected to any suitable hydraulic system (not shown) or other drive system configured to selectively move the rotary actuator thereby pivoting conveying portion 42. Although rotary actuator 154 is shown to be included in second pivoting connector assembly 152, the rotary actuator may be used for any combination of the pivoting connector assemblies discussed above. Additionally, the pivoting connector assemblies discussed may include any combination of telescoping cylinders, rotary actuators, and/or other suitable pivoting structure.

Although the adjustable conveyor system and features of the adjustable conveyor system have been shown and described with reference to the foregoing operational principles and preferred embodiments, those skilled in the art will find apparent that various changes in form and detail may be made without departing from the spirit and scope of the claims. The present disclosure is intended to embrace all such alternatives, modifications, and variances that fall within the scope of the appended claims.

We claim:

1. A system for conveying material, comprising:
    a hopper having a hopper feed end and a hopper discharge end, wherein the hopper feed end is configured to receive material; and
    an elongate conveyor including a conveyor feed end downstream from the hopper discharge end, a conveyor discharge end spaced from the conveyor feed end, and first and second elongate sides, wherein at least a substantial portion of the elongate conveyor is configured to pivot about at least three non-parallel axes, and wherein the material conveyed from the conveyor feed end to the conveyor discharge end moves in a first direction when the elongate conveyor is in an extended position, and the at least a substantial portion of the elongate conveyor is configured to pivot about a first axis that is parallel to the first direction and is between the first and second elongate sides.

2. The system of claim 1, further comprising at least one pivoting connector assembly configured to pivot the elongate conveyor about the at least three axes.

3. The system of claim 2, wherein the at least one pivoting connector assembly includes at least one telescoping cylinder operatively connected to the elongate conveyor.

4. The system of claim 2, wherein the at least one pivoting connector assembly includes at least one rotary actuator operatively connected to the elongate conveyor.

5. The system of claim 2, wherein the at least one pivoting connector assembly includes at least one telescoping cylinder and at least one rotary actuator.

6. A system for conveying material, comprising:
   a hopper having a feed end and a discharge end, wherein the feed end is configured to receive material; and
   an elongate belt conveyor downstream from the discharge end, wherein the elongate conveyor is configured to pivot about at least three non-parallel axes, and the hopper is configured to pivot when the elongate conveyor pivots about one or more of the at least three non-parallel axes.

7. The system of claim 6, further comprising at least one pivoting connector assembly configured to pivot the elongate conveyor about the at least three axes.

8. The system of claim 7, wherein the at least one pivoting connector assembly includes at least one telescoping cylinder operatively connected to the elongate conveyor.

9. The system of claim 7, wherein the at least one pivoting connector assembly includes at least one rotary actuator operatively connected to the elongate conveyor.

10. A system for conveying material, comprising:
    a hopper having a feed end and a discharge end, wherein the feed end is configured to receive material; and
    an adjustable belt conveyor downstream from the discharge end, wherein at least a substantial portion of the adjustable conveyor is configured to pivot about at least two non-parallel axes, and the hopper is configured to pivot when the at least a substantial portion of the adjustable conveyor pivots about one or more of the at least two non-parallel axes.

11. The system of claim 10, further comprising at least one pivoting connector assembly configured to pivot the adjustable conveyor about the at least two axes.

12. The system of claim 11, wherein the at least one pivoting connector assembly includes at least one telescoping cylinder operatively connected to the adjustable conveyor.

13. The system of claim 11, wherein the at least one pivoting connector assembly includes at least one rotary actuator operatively connected to the adjustable conveyor.

14. The system of claim 11, wherein the at least one pivoting connector assembly includes at least one telescoping cylinder and at least one rotary actuator.

* * * * *